United States Patent
Kjellberg

[11] 3,747,556
[45] July 24, 1973

[54] POWER BOAT LOCKING ARRANGEMENT

[75] Inventor: Knut Janne Kjellberg, Hjalteby, Sweden

[73] Assignee: AB Volvo Penta, Goteborg, Sweden

[22] Filed: Oct. 13, 1971

[21] Appl. No.: 188,901

[52] U.S. Cl. .................................. 115/35, 70/252
[51] Int. Cl. ......................................... B63h 25/52
[58] Field of Search ............... 115/35, 34 R, 18, 115/17, .5; 70/252, 253, 226

[56] References Cited
UNITED STATES PATENTS

| | | | |
|---|---|---|---|
| 3,157,060 | 11/1964 | Marr | 115/18 R X |
| 3,203,390 | 8/1965 | Boda | 115/18 R X |
| 3,590,611 | 7/1971 | Nakashima | 70/252 X |
| 2,036,370 | 4/1936 | Smith | 70/252 X |
| 2,947,278 | 8/1960 | Magill et al. | 115/18 R |
| 3,132,503 | 5/1964 | Pieck et al. | 70/252 X |

Primary Examiner—Milton Buchler
Assistant Examiner—Carl A. Rutledge
Attorney—George H. Baldwin and Arthur G. Yeager et al.

[57] ABSTRACT

A locking arrangement for a power boat having an outboard drive leg steered through a coaxial cable from a steering wheel. The arrangement includes a bolt for locking the steering wheel and an electrical switch for controlling the engine ignition.

1 Claim, 3 Drawing Figures

PATENTED JUL 24 1973 3,747,556

POWER BOAT LOCKING ARRANGEMENT

Various schemes have been employed for deterring theft of boats, including chaining of the boat to a dock or mooring with a padlock, the providing of key-operated ignition switches for power boats, removal of engine ignition harnesses or other essential engine parts, and, of course, providing lights and night watchmen on the boat dock. The deterrant effects of such schemes leave much to be desired. Padlocks and chains may be cut, or the chain ring may be removed from the boat, and key-operated ignition switches may be jimmyed or electrically by-passed, removal of harnesses is inconvenient and replacement harnesses may be substituted by the thief, while lights and watchmen are expensive and frequently ineffective.

An object of the invention is to provide a convenient and inexpensive arrangement for locking both steering and ignition of a power boat, operable by means of a lock key.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
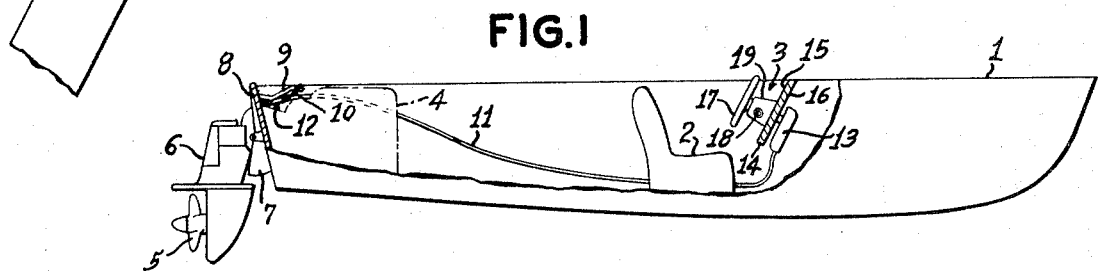
FIG. 1 is a side elevational view of a boat, partially broken away and in section, embodying the invention.

Referring to FIG. 1 of the drawings, the invention is illustrated as applied to an inboard-outboard powered runabout comprising a planing hull 1 provided with a helmsman's seat 2 at control station 3. An inboard engine 4 is arranged to drive propeller 5 of outboard drive leg 6. The leg 6 is steerably mounted by means of a vertical pivot support 7 to transom 8 of the boat.

The outboard leg may, for example, be of the type shown in U. S. Pat. No. 3,339,517 to Bergstedt or of the type shown in U. S. Pat. No. 3,245,374 to Urbassik, and comprises a steering lever 9 accessible within the boat for attachment thereto in known manner of the core 10 of a coaxial cable assembly 11. The sheath of the cable assembly is fixedly mounted to the boat adjacent lever 9 by a bracket 12.

The cable assembly extends within the boat forwardly from the transom to the remote helmsman's station terminating in a control head 13 which is mounted to a control panel 14. The panel has a front face 15 and a back face 16, and control head 13 is disposed behind or under the back face, and a steering wheel 17 is positioned in front of the front face. A key-operated lock 18 is disposed between the steering wheel and the panel so as to expose the key opening through a hole in bezel 19.

Figure 2:
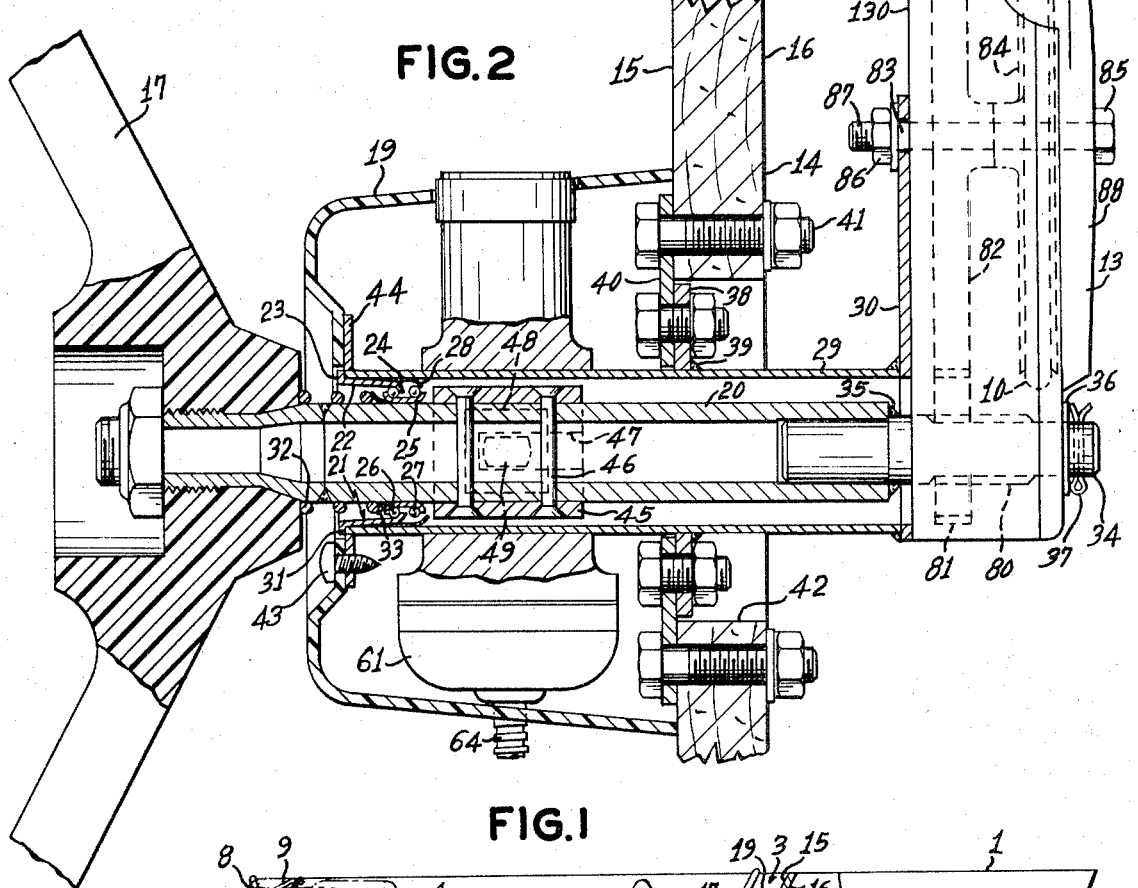
FIG. 2 is a detail side view on an enlarged scale showing portions of the steering and locking arrangement partially broken away and in section.

As best seen in FIG. 2, the steering wheel 17 is fixed to a shaft 20 rotatably carried by a ball bearing assembly 21. This assembly includes a cup-shaped outer race member 22 having an outwardly extending flange 23 at one end and an inwardly extending flange 24 at the other end, an inner race 25 engaged on shaft 20, and two rows of balls 26 and 27 between which flange 24 is caged. A thin metal shell 28 retains balls 27 in race 25. The cup-shaped outer race member 22 is disposed in a rigid tube 29 which is welded at one end to a plate 30 forming an integral portion of the housing 130 of head 13, flange 23 being engaged against the other end 31 of the tube. A coiled compression spring 32 is disposed around shaft 20 between the steering wheel 17 and a seat member 33 which, in turn, bears against race 25 thereby urging flange 23 against the tube end. Shaft 20 may be hollow throughout most of its length as shown. A solid extension portion 34 of the shaft is joined by a weld 35 to the hollow portion of the shaft and the extension 34 extends through housing 130 and carries a washer 36 and cotter pin 37 beyond the housing to retain the shaft against longitudinal movement due to the force of spring 32.

A collar or flange 38 is welded by a weld 39 externally to tube 29 spacedly between its ends and a mounting ring 40 is bolted to flange 38. Bolts 41 disposed outwardly around panel opening 42 join ring 40 to panel 14, thereby rigidly mounting tube 29 and head 13 to the panel. Trim bezel 19 is connected to tube 29 by self-tapping screws 43 engaged in an outward flange portion 44 at the end 31 of the tube.

Figure 3:
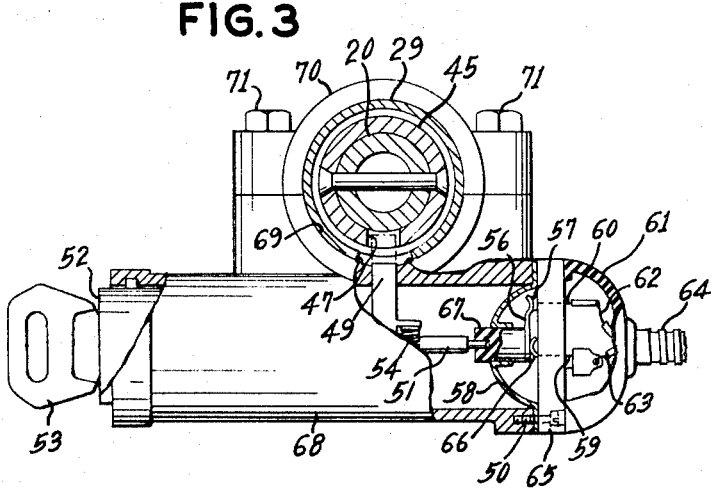
FIG. 3 is an end view of portions of the apparatus shown in FIG. 2 partially broken away and in section.

As seen in FIGS. 2 and 3, shaft 20 is provided with a sleeve 45 riveted thereto by rivets 46 at a position between steering wheel 17 and the front face 15 of the panel. The sleeve, which thus becomes an integral reinforced portion of the shaft 20, has a lock bolt receiving aperture 47, and the tube 29 is cut away at 48 in order to pass a lock bolt 49 for engagement in aperture 47.

The lock bolt is actuated by a tumbler lock mechanism 52 operated by a removable key 53. Bolt 49 is urged toward shaft 20 by spring means in housing 68. When the key 53 is inserted into the lock mechanism with the bolt extended and engaged in aperture 49, and the key is then rotated by, for example, 90°, the bolt is retracted into the position shown. The mechanism preferably includes means for preventing removal of the key when it is turned away from locked position. Turning the key back to its original locked position does not release the bolt, but upon subsequent removal of the key, the bolt is released to snap out toward the aperture under the influence of a spring included in the lock mechanism, such as is indicated at 54. If the steering shaft 20 is now rotatively positioned to align the aperture with the bolt, the bolt enters the aperture. Otherwise the bolt would strike the collar 45 and ride thereon until subsequent rotation of the steering wheel causes the aperture to become aligned, whereupon the bolt is forced into the aperture by the spring means. No claim being made to the lock mechanism per se, and since lock arrangements are known for providing the bolt functions described, the specific lock mechanism is not illustrated in the drawing.

The turning of the key as above described further serves to rotate a shaft 51 to which is keyed an insulating material shaft 67 of a switch 58. Switch arm 56 is carried by shaft 67 and contact thereto is made by a spring member 66 from lug terminal 59. Fixed contact 57 is connected to lug terminal 60. The terminals and contacts are carried by insulating plate 65 which is screwed to housing 68 by screws 50. Insulated wires 62 and 63 are clipped to lugs 60 and 59 within removable socket 61 and extend into armored electrical cable sheath 64 and thence to the battery and ignition system of the engine in a known manner.

Arm 56 is out of contact with contact 57 when the key is in locked position but makes contact when the key is turned so as to retract bolt 49. Additional contacts may, of course, be provided in switch 58 to control an electric starter for the engine or for other purposes.

Housing 68 comprises a unitary semicylindrical cavity portion 69 and a removable semicyclindrical yoke portion 70 which together surround tube 29. The yoke portion is joined to the housing 68 by means of bolts 71, and the housing is tightly clamped on the tube by taking up on these bolts.

Within the steering cable head housing 130, as shown in broken lines, a flatted portion 80 of shaft extension 34 drivingly carries a small diameter gear 81 which is in mesh with a larger gear 82 journalled on a central shaft 83. Gear 82, in turn, is connected to drive a hobbed gear 84, also journalled on shaft 83, and the core 10 is engaged on gear 84 to be driven thereby. Shaft 83 is formed with a head 85 at one end and at the other end is provided with a nut 86 engaged on screw threads 87, whereby shaft 83 serves as a through-bolt to retain cover portion 88 on housing 130.

The sheath of the flexible coaxial cable preferably comprises an outer plastic covering 89 lined with wires 90 within which the core 10 slides longitudinally. The core may be helical, as shown, and the teeth of gear 84 are shaped to drivingly mesh therewith. The sheath is fixed to head 13 by means of compression nut 91 screwed to a boss 92 of the housing 130. Turning of steering wheel 17 rotates shaft 20 and gear 81, and gear 81 drives gear 82. Gear 82, being connected to gear 84, causes gear 84 to rotate and thus to push and pull core 10 in and out of the sheath 89, 90. The action is transmitted along cable 11 to extend and retract the core from and into the end of the sheath which is anchored by bracket 12 resulting in corresponding swinging movement of steering lever 9.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a system for pivotally steering an outboard power leg mounted on a boat from a remote helmsman's station at which there is a steering wheel mounting panel having a front and a back face and having an opening therethrough, a rigid tube having two ends and adapted and arranged to extend through said opening with one said end disposed spacedly in front of said panel and the other said end disposed spacedly behind said panel, means fixed to said tube for mounting said tube to said panel, a steering cable control head mounted on said other end of said tube, a shaft having two end portions, a steering wheel attached to one of said end portions of said shaft, said shaft extending from said one end portion into said one end of said tube and through said tube and into said head, a ball bearing for said shaft disposed within and adjacent said one end of said tube, said bearing including an outer race member having an outwardly directed flange engaged with said one end of said tube and extending from said flange into said tube, and an inner race disposed on said shaft within said tube, a compression spring disposed between and seated respectively against said steering wheel and said inner race thereby to urge said flange into such engagement, said shaft extending through said head and comprising an end portion protruding therebeyond, said last mentioned end portion being provided with a thrust bearing against said head effective to retain said shaft against displacement in response to the force of said compression spring against said steering wheel, said shaft including a laterally open lock-bolt-receiving aperture located between said bearing and said front face of said panel, said tube having a side opening aligned with said aperture, a key operated lock body, a lock body housing disposed outwardly of said tube, means fixing said housing to said tube in covering relation to said side opening, a lock bolt carried by said housing in alignment with said side opening, said aperture being aligned with said lock bolt in one rotative position of said shaft, spring means urging said bolt outwardly of said housing toward said aperture, switch carried by said housing, means operably connecting said lock body to said switch and lock bolt for retracting said bolt from said aperture against the force of said spring and for concurrently operating said switch from one to the other of open and closed circuit positions in response to rotation of said key in said lock body in one direction, and for operating said switch from the other to said one circuit position and for concurrently releasing said bolt upon rotation of said key in the opposite direction, a steering cable extending from said head to said leg for transmitting steering movements thereto, a drive engine and a battery in said boat, said engine comprising an electrical component, and means connecting said component to said battery through said switch.

* * * * *